(12) United States Patent
Brodersen et al.

(10) Patent No.: US 10,726,388 B2
(45) Date of Patent: Jul. 28, 2020

(54) COMPONENT TRACKING METHOD AND SYSTEM

(71) Applicant: Accenture Global Solutions Limited, Dublin (IE)

(72) Inventors: Christopher Paul Brodersen, Sparta, NJ (US); David B. Treat, Ridgefield, CT (US); Giuseppe Giordano, Alpes-Maritimes (FR); Craig Alexander Gottlieb, Mystic, CT (US); Sherman Baldwin, Darien, CT (US); Emmanuel Viale, Alpes-Maritimes (FR)

(73) Assignee: Accenture Global Solutions Limited, Dublin (IE)

( * ) Notice: Subject to any disclaimer, the term of this patent is extended or adjusted under 35 U.S.C. 154(b) by 72 days.

(21) Appl. No.: 15/428,988

(22) Filed: Feb. 9, 2017

(65) Prior Publication Data
US 2018/0225629 A1 Aug. 9, 2018

(51) Int. Cl.
*G06Q 10/08* (2012.01)
*G06Q 10/00* (2012.01)
(Continued)

(52) U.S. Cl.
CPC ......... *G06Q 10/0875* (2013.01); *G06F 16/27* (2019.01); *G06F 16/9024* (2019.01);
(Continued)

(58) Field of Classification Search
CPC .. G06Q 10/0875; G06Q 10/20; G06Q 10/087; G06F 17/30283; G06F 17/30958;
(Continued)

(56) References Cited

U.S. PATENT DOCUMENTS 5,365,312 A * 11/1994 Hillmann ............. B41J 2/17546
101/336
5,778,381 A 7/1998 Sandifer
(Continued)

FOREIGN PATENT DOCUMENTS

WO WO 02/33625 4/2002

OTHER PUBLICATIONS

European Patent Office, Extended European Search Report, with Written Opinion, for European Application No. 18150503.3 dated Mar. 6, 2018, pp. 1-8.
(Continued)

*Primary Examiner* — Florian M Zeender
*Assistant Examiner* — Nicole Elena Bruner
(74) *Attorney, Agent, or Firm* — Brinks Gilson & Lione

(57) ABSTRACT

A method for tracking components of equipment. The method includes generating a first record in a component tracking data store of a component tracking system for storing original constituent component identification information that specifies original constituent components of the equipment, and a second record in the component tracking data store of the component tracking system for storing replacement component identification information that specifies a replacement component that replaces a component of the original constituent components of the equipment. The method further includes receiving a request for a current listing of components in the equipment and locating records in the component tracking data store of the component tracking system associated with the equipment. The method further includes determining from the located records a current listing of components to be the original constituent components of the first record as modified by the replacement component specified in the second record, and
(Continued)

communicating a bill-of-material that includes the current listing of components to a requesting entity.

12 Claims, 12 Drawing Sheets

(51) Int. Cl.
    *G06F 16/27*     (2019.01)
    *G06F 16/901*     (2019.01)
    *G06F 16/23*     (2019.01)
    *G06F 16/903*     (2019.01)
    *G06F 3/06*     (2006.01)
    *G05B 23/00*     (2006.01)

(52) U.S. Cl.
    CPC ............ *G06Q 10/20* (2013.01); *G05B 23/00* (2013.01); *G06F 3/06* (2013.01); *G06F 16/23* (2019.01); *G06F 16/90335* (2019.01)

(58) Field of Classification Search
    CPC ......... G06F 17/30289; G06F 17/30153; G06F 17/30002; G06F 17/30979; G06F 11/08; G06F 11/14; G06F 11/16; G06F 3/0638; G06F 16/27; G06F 16/9024; G06F 16/23; G06F 16/90335
    USPC ............................................ 705/29; 707/107
    See application file for complete search history.

(56) References Cited

U.S. PATENT DOCUMENTS

| | | | |
|---|---|---|---|
| 10,318,904 B2 * | 6/2019 | Johnson | ........... G06Q 10/06315 |
| 10,417,614 B2 * | 9/2019 | Johnson | ............. G05B 23/0251 |
| 2003/0135431 A1 * | 7/2003 | Schwartz | ............. G06Q 10/087 |
| | | | 705/28 |
| 2003/0220852 A1 * | 11/2003 | Back | ................ G05B 19/41865 |
| | | | 705/29 |
| 2007/0114280 A1 | 5/2007 | Coop et al. | |
| 2012/0136741 A1 * | 5/2012 | Agarwal | ................ G06Q 10/00 |
| | | | 705/26.1 |
| 2015/0379510 A1 | 12/2015 | Smith | |
| 2016/0269182 A1 | 9/2016 | Sriram et al. | |
| 2016/0358186 A1 * | 12/2016 | Radocchia | ............. H04W 4/70 |
| 2018/0225651 A1 * | 8/2018 | Stone | .................... G06Q 50/10 |

OTHER PUBLICATIONS

Swan, "Blockchain," dated Jan. 22, 2015, retrieved from the Internet: URL: http://w2.blockchain-tec.net/blockchain-by-melanie-Swan.pdf retrieved on Sep. 13, 2017, pp. 1-149.

Examination Report issued on European Patent Application No. 18150503.3 dated Mar. 2, 2020, 7 pages.

* cited by examiner

Component data store 150

| Token ID | Description | Service Information ||| Install Information ||| Manufacturer Information |
| | | Distance (miles) | Time (hrs) | Conditions | Date | Location | Tech ID | |
| --- | --- | --- | --- | --- | --- | --- | --- | --- |
| 38259384 | Combustor | 100000 | 1000 | Land | 01/01/2016 | Seattle | 234 | ABC |
| 59438275 | Turbine | 100000 | 1000 | Land | 01/01/2016 | Seattle | 234 | DEF |
| 79238576 | Compressor | 100000 | 1000 | Land | 01/01/2016 | Seattle | 112 | DEF |
| 02857356 | Afterburner | 100000 | 1000 | Land | 01/01/2016 | Seattle | 112 | ABC |
| 58464312 | Exhaust Nozzle | 100000 | 1000 | NA | 01/01/2016 | Seattle | 432 | XYZ |
| 99225533 | Exhaust Nozzle | 0 | 0 | NA | TBD | TBD | TBD | XYZ |

| BOM for ID#: ae72kzr5 | | |
|---|---|---|
| Part Name | Token ID | Install Date |
| Combustor | 38259384 | January 1, 2016 |
| Turbine | 59438275 | January 1, 2016 |
| Compressor | 79238576 | January 1, 2016 |
| Afterburner | 02857356 | January 1, 2016 |
| Exhaust Nozzle | 58464312 | January 1, 2016 |
| ... | ... | ... |

| BOM for ID#: ae72kzr5 | | |
|---|---|---|
| Part Name | Token ID | Install Date |
| Combustor | 38259384 | January 1, 2016 |
| Turbine | 59438275 | January 1, 2016 |
| Compressor | 79238576 | January 1, 2016 |
| Afterburner | 02857356 | January 1, 2016 |
| Exhaust Nozzle | 99225533 | December 1, 2016 |
| ... | ... | ... |

Fig. 6B

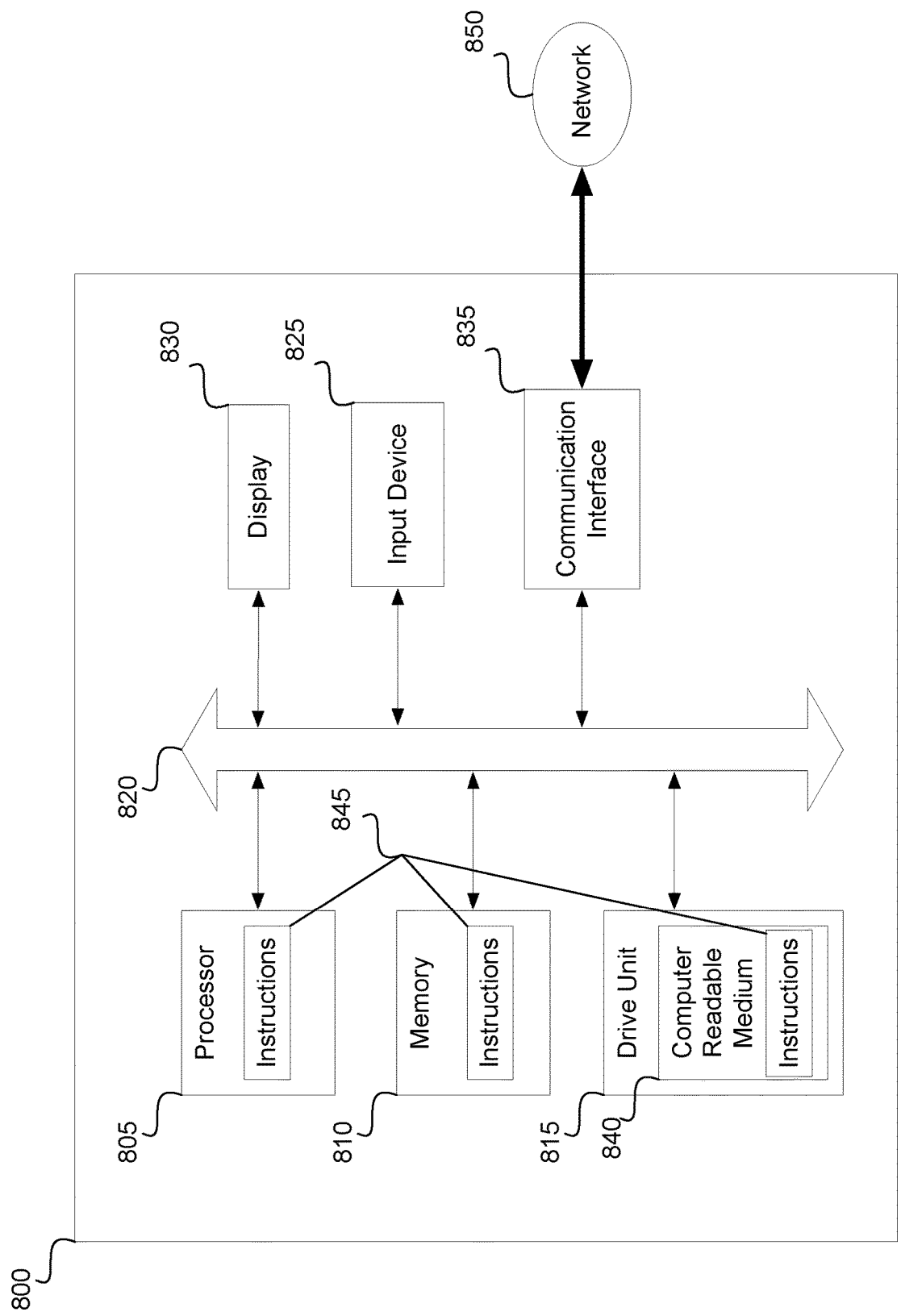

COMPONENT TRACKING METHOD AND SYSTEM

COMPONENT TRACKING METHOD AND SYSTEM BACKGROUND

Field

This application generally relates to manufacturing and maintenance processes for complex equipment. In particular, this application describes a method and system for tracking components of equipment in real-time.

Description of Related Art

Equipment manufacturers typically maintain a bill-of-material (BOM) to track constituent components of equipment. For example, the manufacturer of an aircraft engine may generate a BOM that specifies all the components, subassemblies, etc. that, when assembled, form the engine. For each component, the BOM may provide the component type or name, a unique serial number, a manufacture date of the component, a source of the component and/or other information as the case may be.

The BOM is ordinarily required in purchasing and assembly operations of the equipment manufacturer. For example, a purchasing entity may generate component orders based on the BOM. Assembly operators may utilize the BOM to gather components within a factory for assembly.

In some industries, the BOM for the equipment may be updated over time to reflect a current state of components within the equipment. For example, in the context of a BOM for aircraft equipment, which is expected to have a long service life, maintenance operators may update the BOM to reflect the fact that a component of the equipment has been replaced. Thus, the BOM in this case is a living document intended to reflect the state of the components of the equipment at any given time.

Such a BOM may be required to facilitate, for example, determining a maintenance schedule for the equipment. In some instances, a so-called living BOM may be required by, for example, agency regulators such as the Federal Aviation Administration FAA, which may require an updated BOM to determine the current state of components within an aircraft at the time of an incident involving the aircraft.

BRIEF SUMMARY

In one aspect, a method for tracking components of equipment is provided. The method includes generating a first record in a component tracking data store of a component tracking system for storing original constituent component identification information that specifies original constituent components of the equipment, and a second record in the component tracking data store of the component tracking system for storing replacement component identification information that specifies a replacement component that replaces a component of the original constituent components of the equipment. The method further includes receiving a request for a current listing of components in the equipment and locating records in the component tracking data store of the component tracking system associated with the equipment. The method further includes determining from the located records a current listing of components to be the original constituent components of the first record as modified by any replacement component specified in the second record, and communicating a bill-of-material that includes the current listing of components to a requesting entity.

In a second aspect, a system for tracking components of equipment includes a processor and non-transitory computer readable media. The non-transitory computer readable media includes instruction code for causing the processor to generate a first record in a component tracking data store of a component tracking system for storing original constituent component identification information that specifies original constituent components of the equipment, and to generate a second record in the component tracking data store of the component tracking system for storing replacement component identification information that specifies a replacement component that replaces a component of the original constituent components of the equipment. The instruction codes causes the processor to receive a request for a current listing of components in the equipment and locate records in the component tracking data store of the component tracking system associated with the equipment. The instruction codes causes the processor to determine from the located records a current listing of components to be the original constituent components of the first record as modified by any replacement component specified in the second record, and communicate a bill-of-material that includes the current listing of components to a requesting entity.

In a third aspect, a non-transitory computer readable medium is provided that has instruction code stored therein for tracking components of equipment. The instruction code is executable by a machine for causing the machine to perform acts including generating a first record in a component tracking data store of a component tracking system for storing original constituent component identification information that specifies original constituent components of the equipment and generating a second record in the component tracking data store of the component tracking system for storing replacement component identification information that specifies a replacement component that replaces a component of the original constituent components of the equipment. The instruction codes causes the machine to perform acts of receiving a request for a current listing of components in the equipment and locating records in the component tracking data store of the component tracking system associated with the equipment. The instruction codes causes the machine to perform acts of determining from the located records a current listing of components to be the original constituent components of the first record as modified by any replacement component specified in the second record, and communicating a bill-of-material that includes the current listing of components to a requesting entity.

BRIEF DESCRIPTION OF THE DRAWINGS

FIG. 2A illustrates exemplary component information that may be stored in a component data store of the computer tracking system;

FIGS. 6A and 6B illustrate exemplary BOM listings;

FIG. 8 illustrates an exemplary computer system that may form part of or implement the systems described in the figures or in the following paragraphs.

DETAILED DESCRIPTION

Figure 1A:
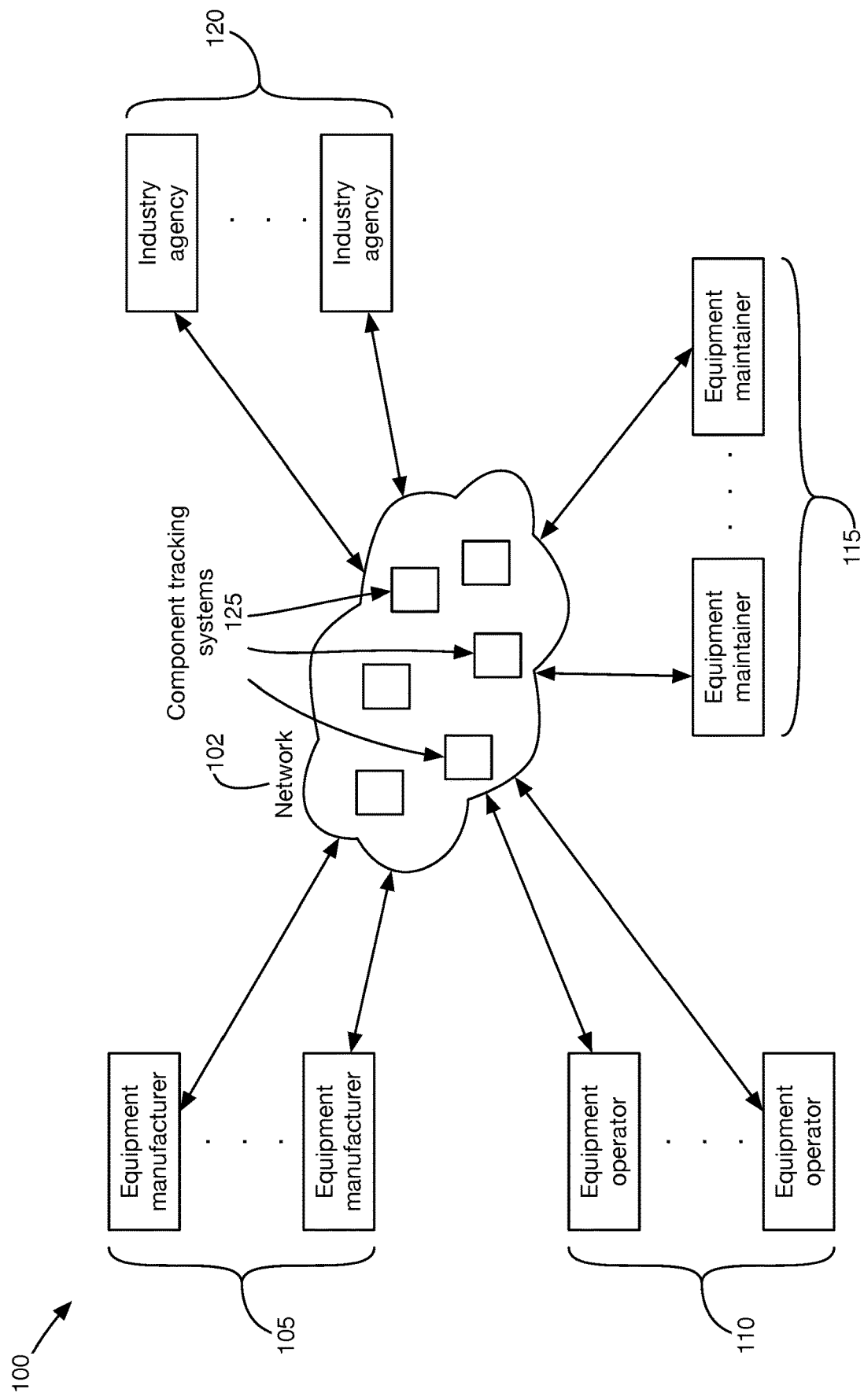
FIG. 1A illustrates an exemplary environment that facilitates real-time tracking of equipment components.

FIG. 1A illustrates an exemplary environment 100 that facilitates real-time tracking of equipment components. Illustrated in the environment 100 are entities that include equipment manufacturers 105, equipment operators 110, equipment maintainers 115, and industry agencies 120. Also illustrated are a group of component tracking systems 125 accessible to the various entities via a network 102.

In the context of airline equipment such as an engine, the equipment manufacturers 105 may correspond to airplane or engine manufacturers. The equipment operators 110 may correspond to airline companies. The equipment maintainers 115 may correspond to companies that repair the airplanes and engines. The industry agencies 120 may correspond to government agencies such as the FAA, which has regulatory oversight over the airline industry. Others entities with a sufficient interest in the contents of the equipment may exist in the environment 100.

Each of the illustrated entities 105, 110, 115, and 120 may correspond to a computer system through which the corresponding correspond party communicates with component tracking systems 125. In this regard, the computer systems may execute client-side instruction code that facilitates communications with the component tracking systems 125. These and other operations of the computer systems are described below.

Figure 1B:
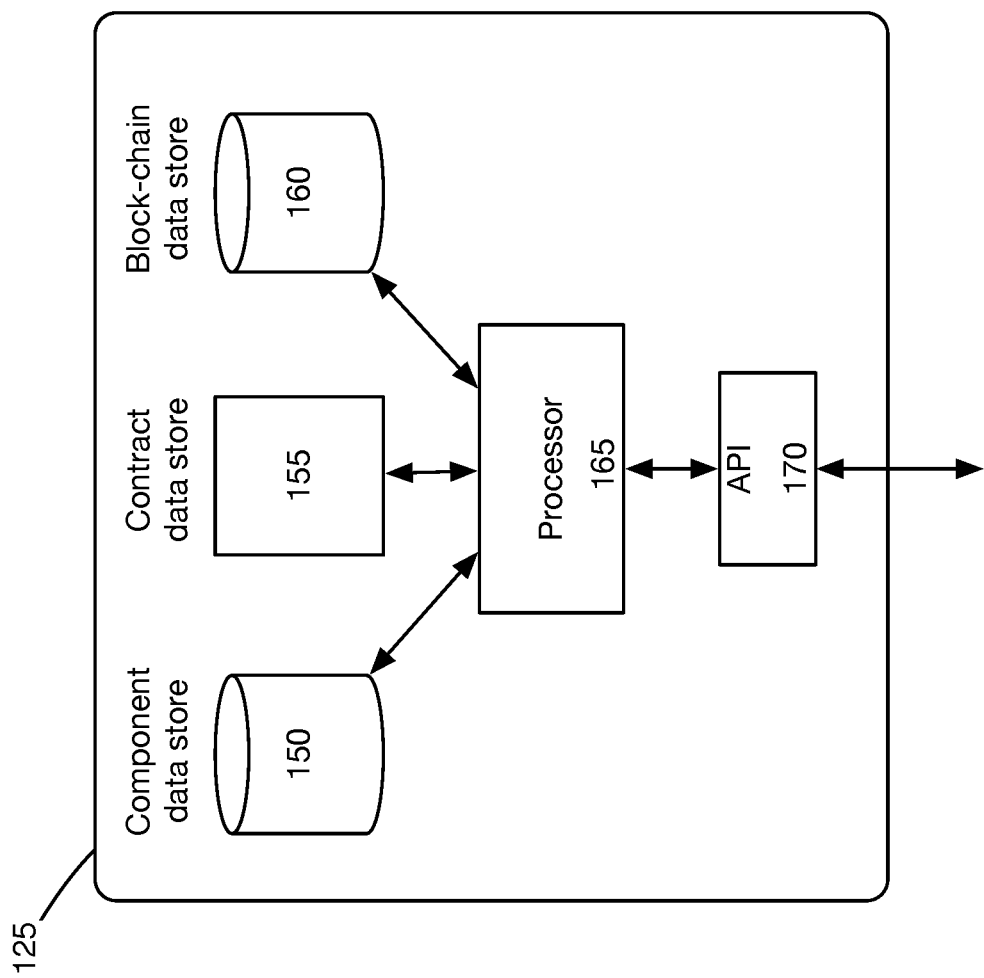
FIG. 1B illustrates an exemplary computer tracking system of the exemplary environment.

FIG. 1B illustrates details of an exemplary component tracking system 125. The component tracking system 125 includes a component data store 150, a contract data store 155, a block-chain data store 160, and a processor in communication with the respective data stores. While the data stores are illustrated as being separate, it is contemplated that the data stores may be combined within a common storage device.

The component tracking system 125 may include an API 170 to facilitate communicating information to and from the component tracking system 125. For example, the API 170 may facilitate downloading a BOM with a listing of all the components currently in equipment. The API 170 may facilitate receiving usage information related to equipment such as a distance traveled by the equipment, usage time associated with the equipment, weather conditions experienced by the equipment, etc. and updating all components currently installed in the equipment according to the usage information. The API 170 may include functionality to facilitate communicating other information to and from the component tracking systems 125 such as maintenance alerts, and instructions for ordering and/or shipping components that need to be replaced. Other functionality may be provided.

Referring to FIG. 2A, the component data store 150 may store records associated with components that may or may not be installed in equipment. Each record includes a unique token ID attribute 270 and various items of information associated with a component. The token ID 270 may be used by the component tracking system 125 to digitally represent a component.

The information in each record may include a description 272, service information 274, install information 276, manufacturer information 278, etc. Other information may be stored. The description 272 may correspond to the name of the component or other identifying information.

The service information 274 may include information that facilitates determining a useful service life of the component. For example the service information may include the distance over which the component has been utilized, the amount of time the component has spent in service, and environmental conditions under which the component was utilized. For example, whether the component was utilized in a corrosive environment may impact of the service life of the component. The service information may also specify a maximum distance or a maximum time a component can experience before requiring service or replacement. Other service information may be included.

The install information 276 may include information related to the installation of the component within equipment. For example, the install information 276 may include an installation date and location. The install information 276 may specify information associated with technicians that installed the component in the equipment. Other install information may be provided.

Other information not illustrated may include a serial number for the component, a unique ID associated with equipment within which the component may be installed. Links or references to key documents such as schematics, technical publications, recall notices, etc. may be provided. Disposition information such as whether the component is still in service may be provided. In this regard, a current location of the component may be specified. This may facilitate locating components no longer in service to confirm that the components remain out of service.

In operation, an entity such as an equipment manufacturer 105 may communicate some or all of the component information described above to one of the component tracking systems 125 via the API 170. Via the API 170, the equipment manufacturer 105 may associate the components with equipment. Upon receipt of the component information from the entity, the component tracking system 125 may be configured to generate a record in the component data store 150 associated with the component for storing the information, or if a record for the component already exists, update the information. Some or all of the information stored in the record may be encrypted to control access to the information.

The component tracking system 125 may then generate a unique token ID for the component. For example, the component tracking systems 125 may hash some of the information provided by the entity and may store the hash value as the token ID attribute of the component record.

In addition to generating the records above, the component tracking system 125 may generate a BOM transaction for generating a BOM associated with the equipment. These aspects are described in more detail below.

After generation of the record and/or updating of the information, the component tracking systems 125 may communicate the record to other component tracking systems 125 to thereby synchronize the component data stores 150 of those systems 125.

Figure 2B:
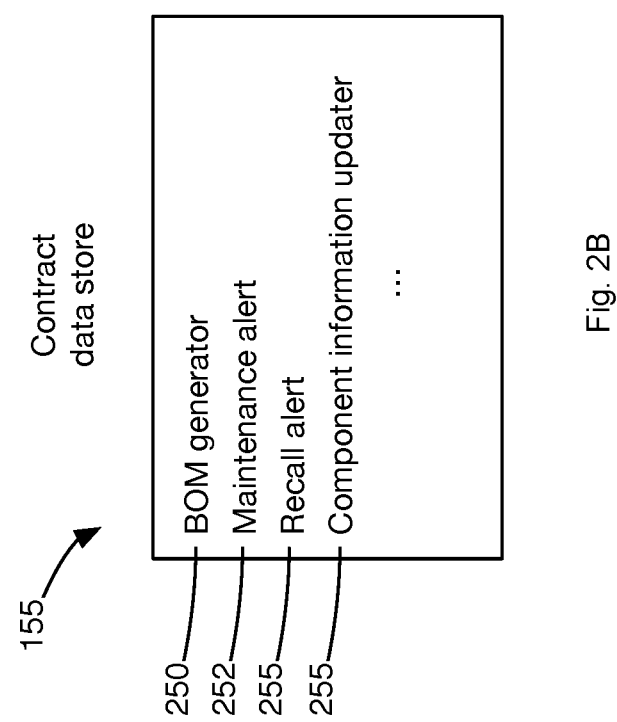
FIG. 2B illustrates exemplary smart contracts that may be stored in a contract data store of the computer tracking system.

Referring to FIG. 2B, the contracts data store 155 includes so-called smart contracts. Each smart contract corresponds to instruction code configured to be executed by the processor 165 to thereby automate operations of the component tracking system 125. The various smart contracts may interface to the APIs 170 described above or different APIs to facilitate communicating information. For example, a first smart contract 250 may configured the processor to generate a BOM in response to a request for the BOM associated with equipment. A second smart contract 252 may configure the processor to generate maintenance alerts in response to usage information changes associated with components of equipment. Exemplary operations performed by the first and second smart contracts 250 and 252 are described below.

A third smart contract 255 may configure the processor to generate recall alerts in response to components being flagged as recalled. A fourth smart contract 255 may configure the processor to facilitate updating component information in response, for example, to update information from an entity such as an equipment owner 110. Other smart contracts may schedule component maintenance, order components when required, etc.

The smart contracts may execute according to a schedule or in response to an event. For example, the second smart contract 252 for generating maintenance alerts may run on a periodic basis in determining whether a particular component is reaching the end of a specified service time. In addition or alternatively, the second smart contract 252 may run in response to one or more updates to component information such as updates to service information. The first smart contract for generating a BOM may operate in response to a request from an entity for the BOM of equipment. The fourth smart contract 255 for updating component information may operate in response to an entity such as an equipment operator 110 specifying to the system 125 a number of miles put on the equipment.

Figure 2C:
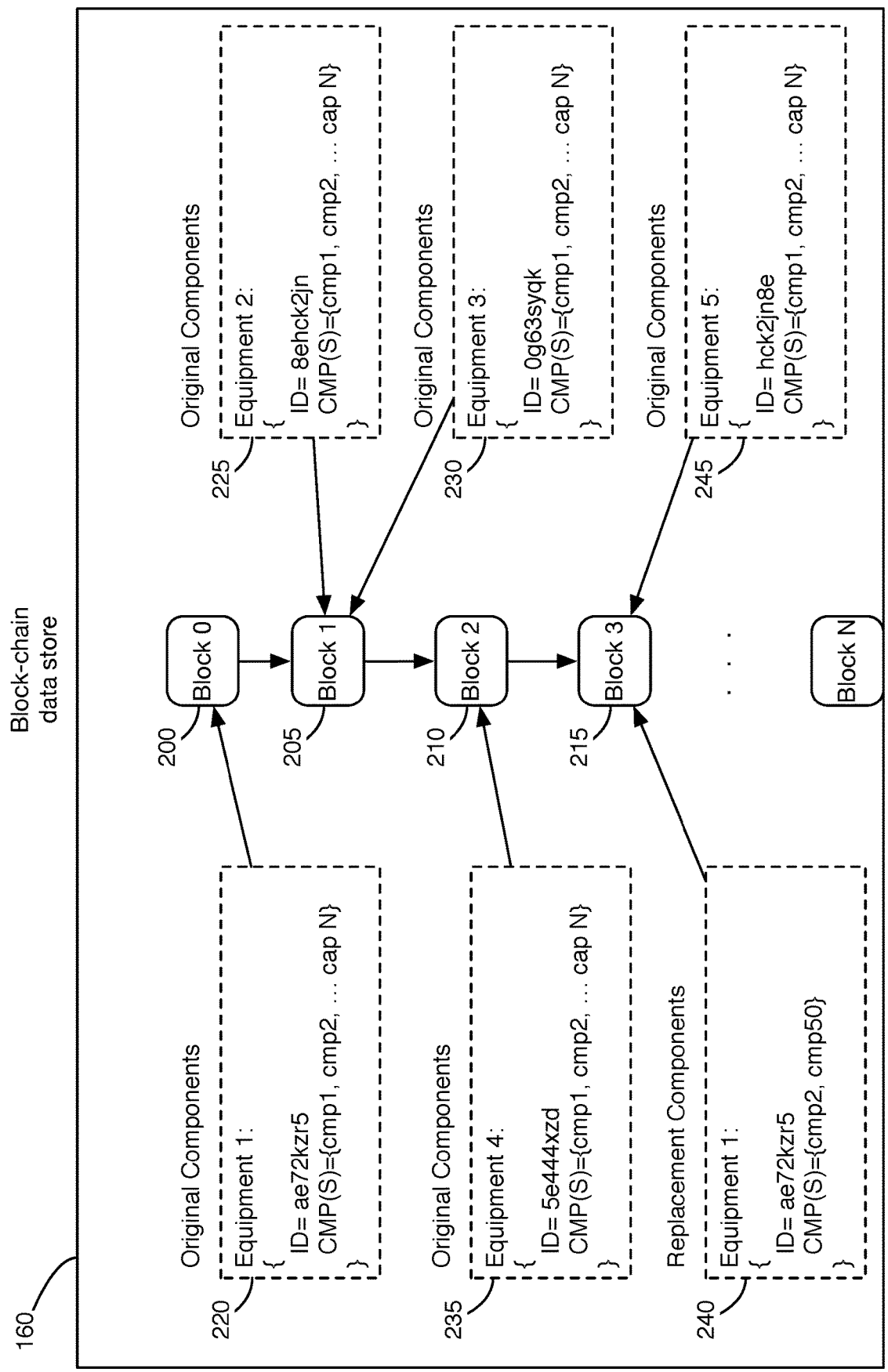
FIG. 2C illustrates exemplary block-chain blocks that may be stored in a block-chain data store of the computer tracking system.

FIG. 2C illustrates exemplary blocks 200-215 that may be stored in the block-chain data store 160. The block-chain data stores 160 of each component tracking system 125 collectively form a distributed block-chain database through which BOM transactions, described below, may be communicated. Unlike a traditional database, which may be centralized or commonly owned and trusted, each of the component tracking system 125 may be non-commonly owned/operated systems for which trust may be lacking.

The blocks 200-215 are generally analogous to traditional database records. Every time a block is added to a block-chain data store 160 of a given component tracking system 125, the block is communicated to the block-chain data stores 160 of the other component tracking systems 125 and replicated within those databases. Consensus algorithms are utilized to form consensus among the different computers systems of the distributed database 125 that the data stored within the blocks is trustworthy.

In operation, a first component tracking system 125 receives a BOM transaction via for example an API or from smart contract code for receiving a BOM from an equipment manufacturer 105. After receiving the BOM transaction or a particular number of BOM transactions, the component tracking system 125 prepares a block for storing the one or more BOM transactions. Generally, this involves determining a hash of header information of the most current block in the centralized distributed database 125, adding this information, a timestamp, and other information into a header of the new block, and appending the one or more BOM transactions to the block.

The component tracking system 125 then attempts to confirm the block and obtain consensus among the various component tracking systems 125 via consensus algorithms.

Once the block is generated, the component tracking system 125 relays the block to other component tracking systems 125. The other component tracking systems 125 determine whether the block is valid and, if so, add the block to their local databases.

FIG. 2C illustrates the blocks 200-215 as being linked to one another. As described in more detail below, the link from a child block (e.g., Block 1 205) to a parent block (e.g., Block 0 200) is determined by way of a reference in the child block to its parent. (See previous block hash 305, FIG. 3A).

Each block stores one or more BOM transactions (220-245). For example, a first BOM transaction 220 is stored in Block 0 220. Second and third BOM transactions 225 and 230 are stored in Block 1 205. A fourth BOM transaction 235 is stored in Block 2 210. Fifth and sixth BOM transactions 240 and 245 are stored in Block 3 215.

Each BOM transaction (220-245) may specify a unique equipment ID and one or more token IDs associated with original or replacement constituent components associated with particular equipment. The unique equipment ID may correspond to a serial number that uniquely identifies the equipment among all other equipment for which information is stored in the component tracking system 125. Other information, as described below, may be stored in the BOM transaction.

As illustrated, the first BOM transaction 220 may specify token IDs associated with original constituent components for Equipment 1, which may correspond to a specific, unique, aircraft engine. The second, third, and forth BOM transactions 225, 230, 235 may specify token IDs associated with original constituent components for Equipment 2, Equipment 3, and Equipment 4, respectively, which may correspond to aircraft engines or different equipment. The fifth BOM transaction 240 may specify a token ID associated with a replacement constituent component for Equipment 1. For example, the token ID may be associated with a fan blade for the engine. Similarly, the sixth BOM transaction 245 may specify the token IDs associated with original constituent components for Equipment 5.

Figure 3A:
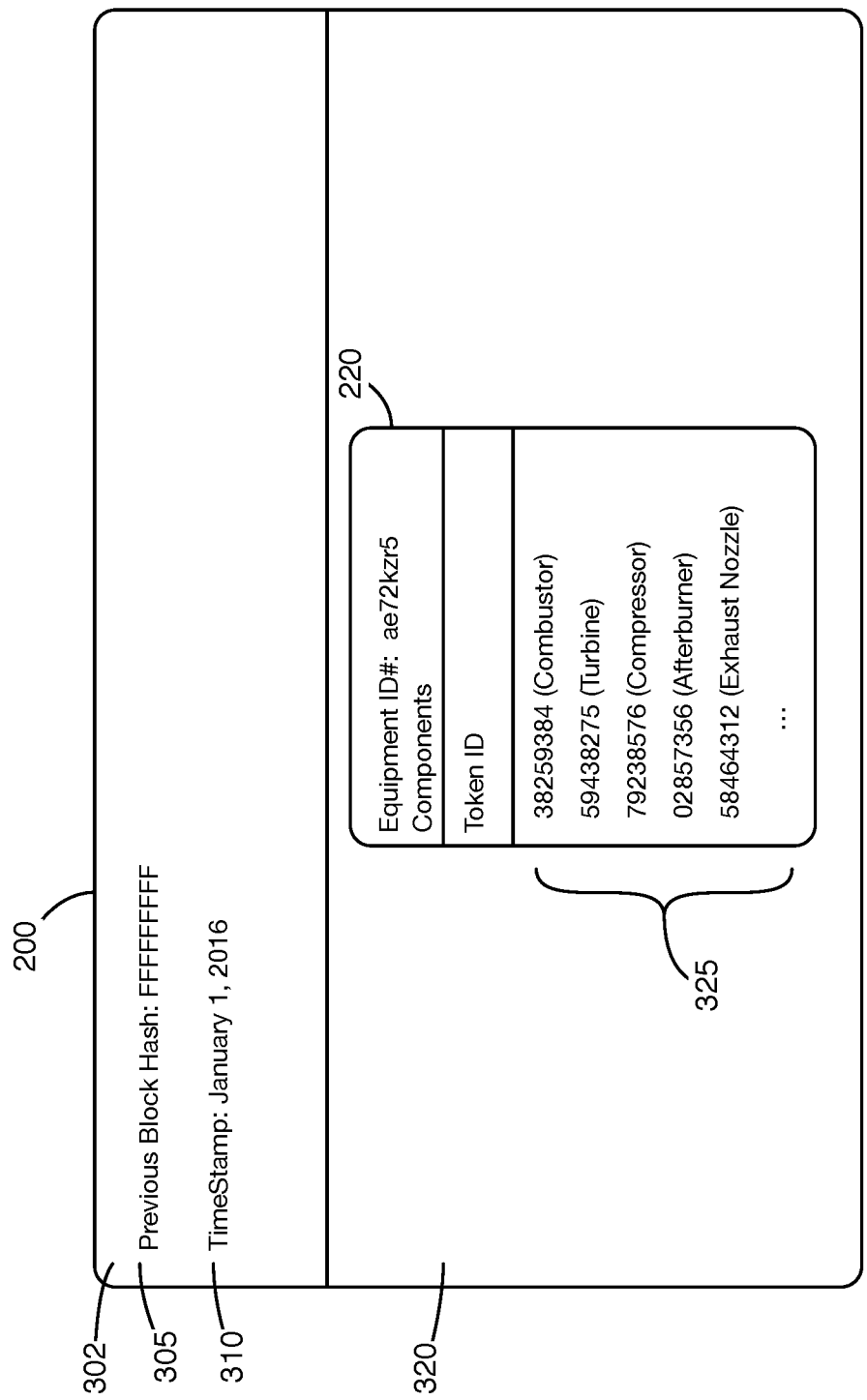
FIGS. 3A and 3B illustrate exemplary details of the blocks illustrated in FIG. 2.
Figure 3B:
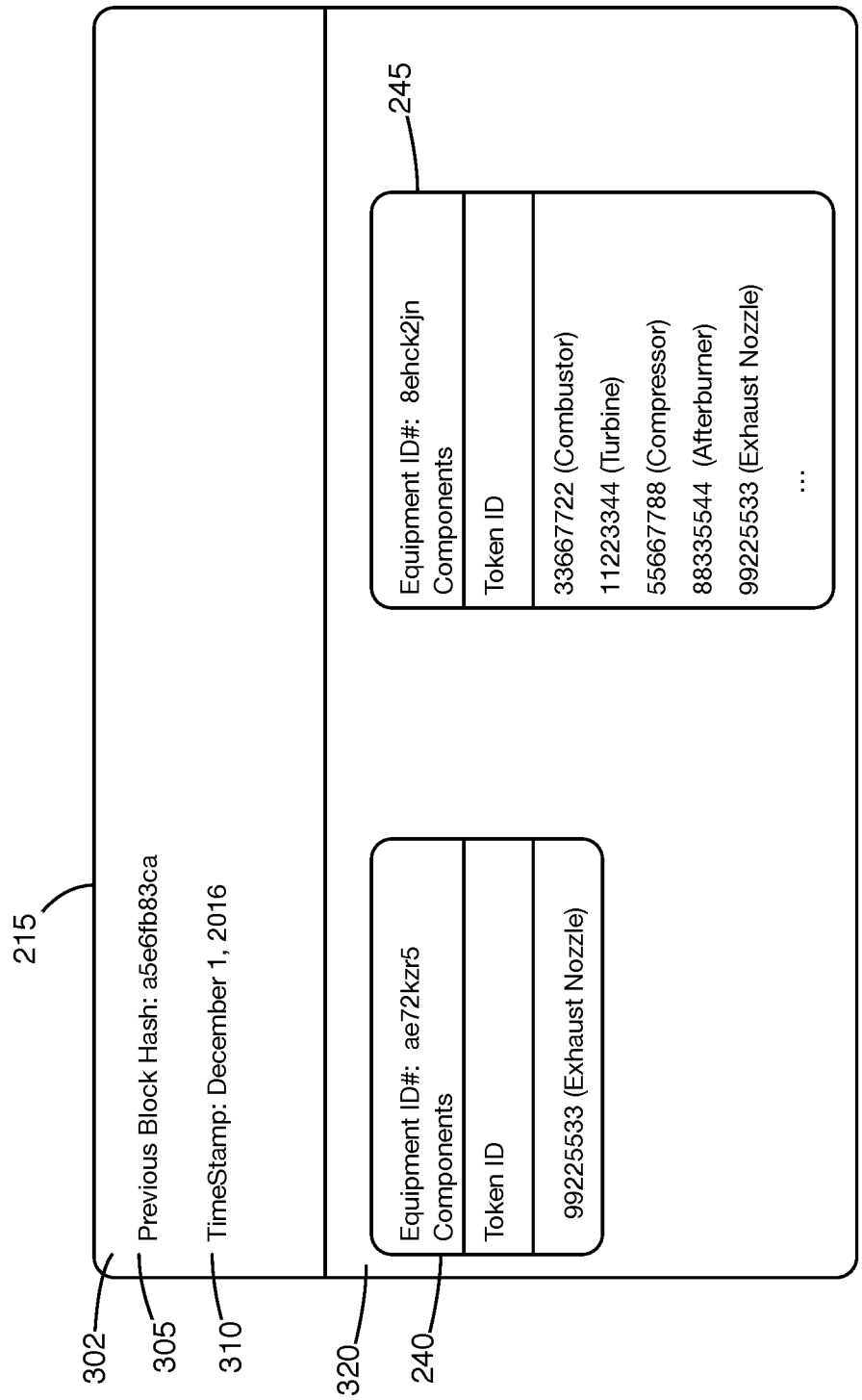

FIGS. 3A and 3B illustrate exemplary details of Block 0 200 and Block 3 215. Referring to FIG. 3A, Block 0 200 includes an exemplary header section 302 that includes a previous block hash 305, and a timestamp 310. Block 0 200 also includes a transaction section 320 that includes a BOM transaction 220.

The previous block hash 305 in the header section 302 is set to indicate that this block is the so-called genesis block and thus has no parent. The timestamp 310 indicates the time at which Block 0 200 was generated on the computer system that generated Block 0 200.

The transaction section 320 includes a single BOM transaction 220, which in this case corresponds to the first BOM transaction 220 illustrated in FIG. 2. As illustrated, the BOM transaction 220 includes a header section that, for example, specifies the equipment ID that uniquely identifies the equipment, and token IDs 325 associated with the constituent components of the equipment identified by the equipment ID. Other information may be provided.

Referring to FIG. 3B, Block 3 215 includes an exemplary header section 302 that includes a previous block hash 305 (i.e., the hash of the header section of Block 0), a timestamp 310, and a transaction section 320. The timestamp 310 indicates the time at which Block 3 215 was generated on the computer system that generated the Block 3 215.

The transaction section 320 includes the fifth and sixth BOM transactions 240 and 245 illustrated in FIG. 2. As noted above and illustrated, the fifth BOM transaction specifies token IDs associated with replacement constituent components for Equipment 1. The sixth BOM transaction specifies token IDs associated with original constituent components for Equipment 5.

Figure 4:
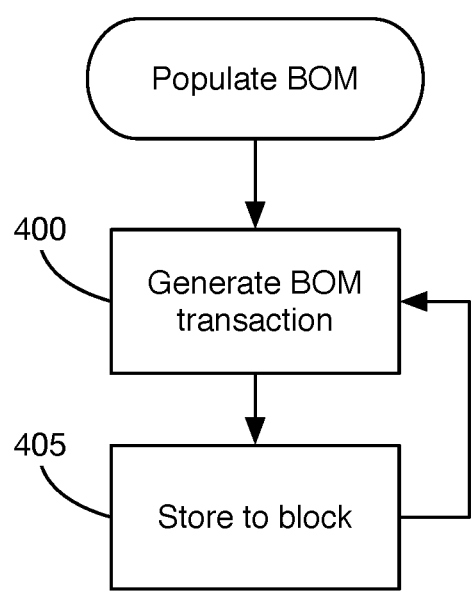
FIG. 4 illustrates operations for populating the decentralized distributed database with BOM transactions.
Figure 5:
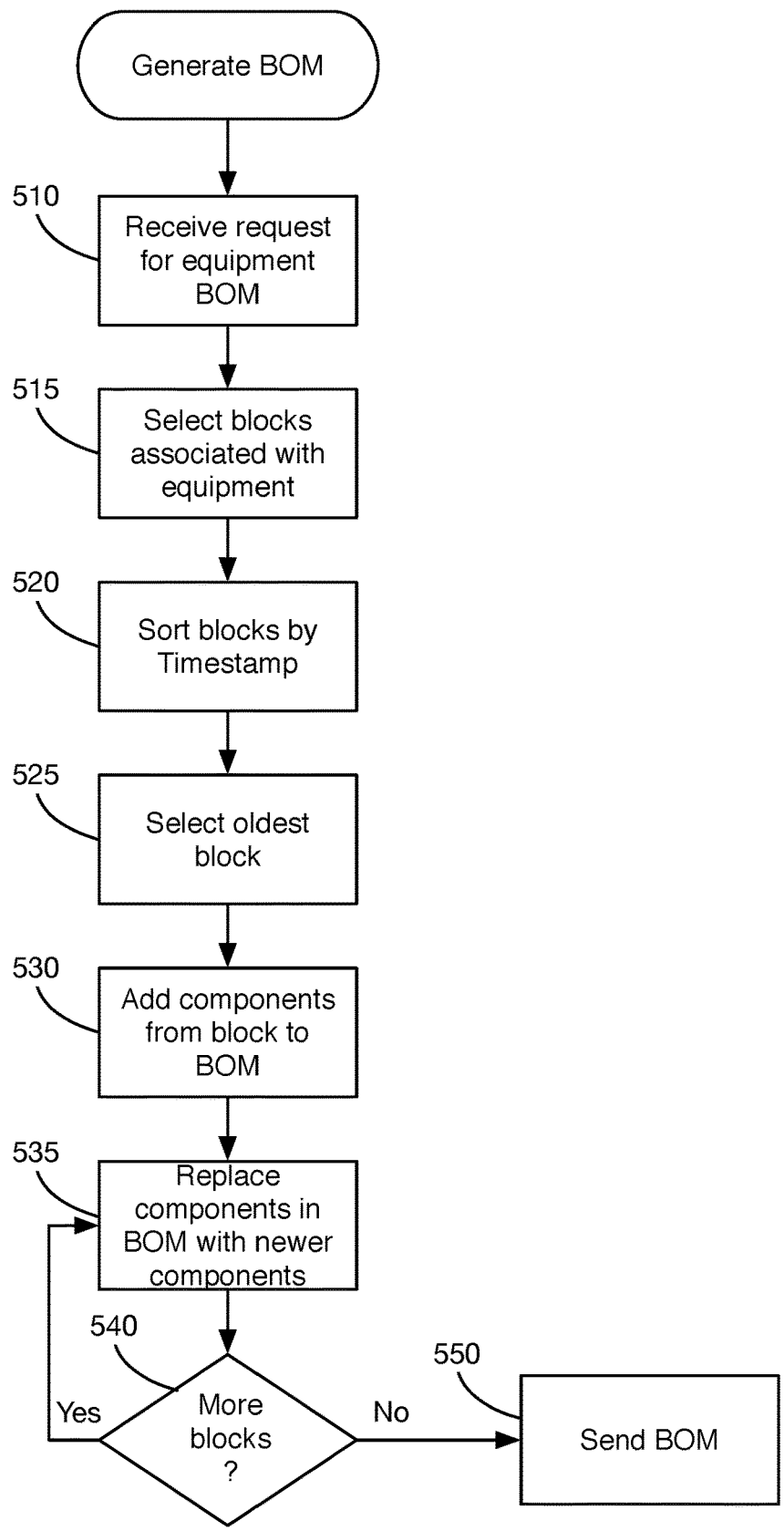
FIG. 5 illustrates operations for generating a bill-of-material (BOM) that specifies/represent the current state of constituent components of equipment.
Figure 7:
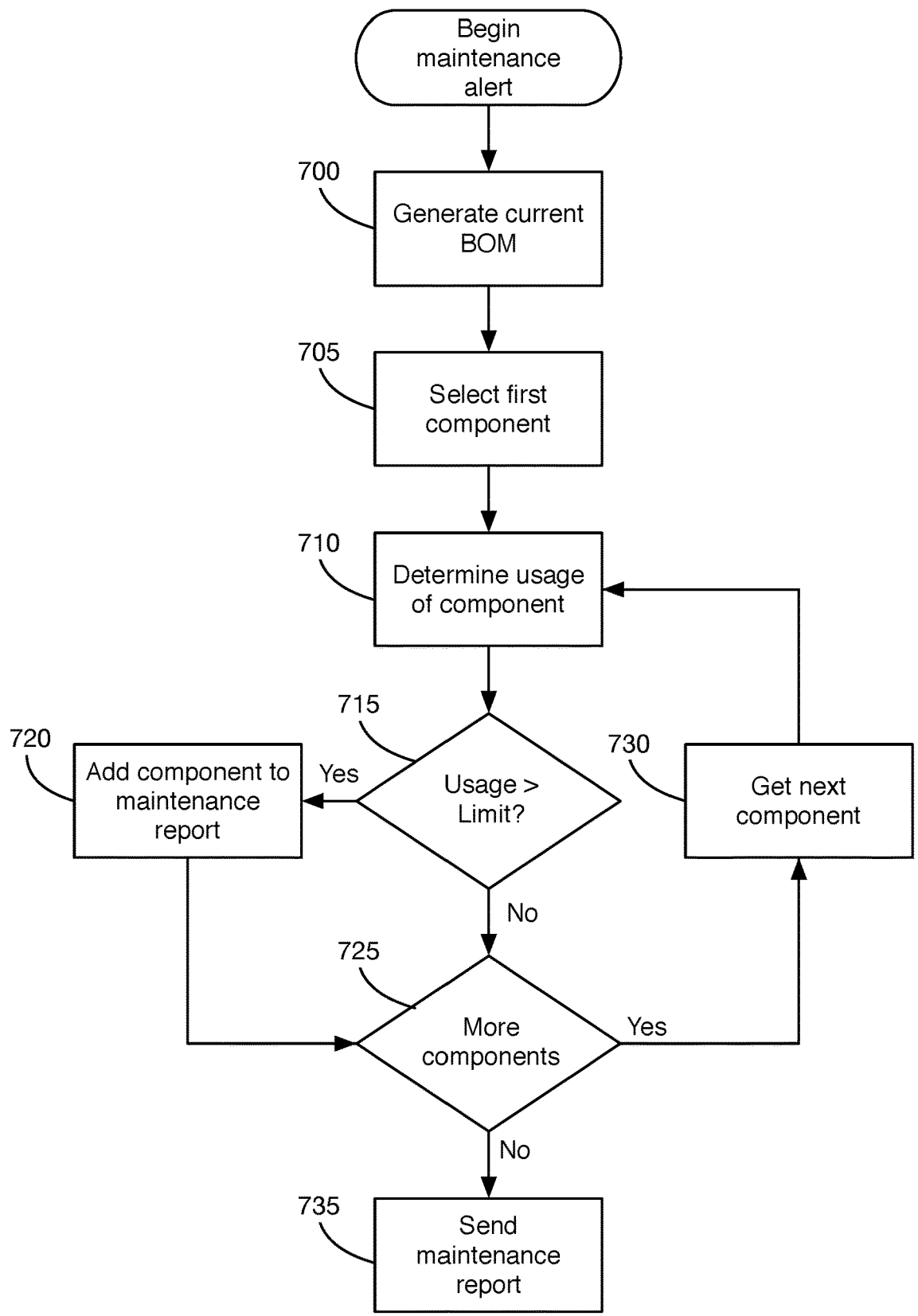
FIG. 7 illustrates operations for determining required maintenance of equipment.

Operations performed by one or more of the component tracking systems 125 are illustrated in FIGS. 4, 5, and 7. In this regard, the operations may be implemented via instruction code stored in non-transitory computer readable media that resides within the component tracking systems 125 configured to cause the respective component tracking systems 125 to perform the operations in the figures.

FIG. 4 illustrates operations for populating the component tracking system 125 with BOM transactions. At operation 400, a BOM transaction may be generated by the component tracking system 125. For example, a computer system such as a computer system associated with an equipment manufacturer 105 and/or an equipment maintainer 115 may execute client side instruction code for both communicating with the component tracking system 125 and for generating BOM transactions. The client side instruction code operating on the computer system of an equipment manufacturer 105 may cause the computer system to provide the original constituent component information specified in the first and sixth BOM transactions 220-245 illustrated in FIGS. 3A and 3B. Client-side instruction code operating on the computer system of the equipment maintainer 115 may cause the computer system to provide the replacement constituent component information such as the information specified in the fifth BOM transaction 240 illustrated in FIG. 3B.

In some implementations, the component tracking system 125 may encrypt the constituent component information in the BOM transaction to control access to the component information within the BOM transaction. For example, private/public keys used in conjunction with an asymmetric encryption algorithm may be utilized to encrypt and decrypt the constituent component information. A different set of key pairs may be provided for every equipment item represented in the component tracking system 125.

The keys necessary to decrypt the BOM transactions for particular equipment may be communicated between entities to facilitate sharing information related to equipment among the entities. For example, an equipment manufacturer 105 may generate a key, associate the key with equipment, and communicate the key to an equipment operator 110 that purchased the equipment. This allows the equipment operator 110 to view the BOM transactions associated with the equipment. Likewise, the equipment operator 110 may communicate the key to an equipment maintainer 115 and an industry agency 120 to allow those entities to view BOM transactions associated with the equipment.

At operation 405, the component tracking system 125 may include the BOM transaction into a block and communicate the block to other component tracking systems 125.

Operations 400 and 405 may repeat each time a new BOM transaction is pushed to the component tracking system 125. For example, an initial BOM transaction may be generated by a component tracking system 125 in response to receipt from a first equipment manufacturer 105 of the original constituent components of equipment. At a later time, the component tracking system 125 may generate a BOM transaction in response to receipt of original constituent components of entirely different equipment from a different equipment manufacturer 105. At yet a later time, the component tracking system 125 may generate may generate a BOM transaction in response to an indication from an equipment maintainer 115 that one of the constituent components of the equipment has been replaced. This process may repeat indefinitely, increasing the number of BOM transactions and, therefore, blocks stored in the component tracking system 125.

FIG. 5 illustrates operations for generating a bill-of-material that specifies/represents the current state of constituent components of equipment for which information is stored in the component tracking system 125. At block 510, a request for the BOM associated with equipment may be received by a component tracking system 125 from, for example, a computer system of an industry agency 120. For example, a user of the computer system of the industry agency 120 may specify a unique identifier associated with the equipment via, for example, a user interface (not shown) and may communicate this information in the request for the BOM.

At operation 515, the component tracking system 125 may select all blocks having a BOM transaction having an equipment ID that matches the requested unique identifier specified by the industry agency. For example, in requesting the ID "ae72kzr5", the component tracking system 125 may select Block 0 200 and Block 3 215 of FIG. 2

At operation 520, the selected blocks may be sorted by the component tracking system 125 according to the timestamps 310 in the headers 302 of the blocks.

At operation 525, an oldest block may be selected. Following the example above, Block 0 200 may be selected.

At operation 530, the constituent components specified in the BOM transactions in the block (i.e., Block 0 200) may be added to a BOM listing. For example, as illustrated in the exemplary BOM listing 600 of FIG. 6A, the components combustor, turbine, compressor, afterburner, exhaust nozzle, etc., and their corresponding token IDs or other information specified in the corresponding record in the component data store 150 associated with the token ID may be added to the BOM listing 600 by the component tracking system 125. For example, the installation date of the component may be added to the BOM listing.

At operation 535, constituent components specified in the BOM transaction in the next block may replace corresponding components listed in the BOM listing. For example, as illustrated in the exemplary BOM listing 605 of FIG. 6B, the exhaust nozzle component with token ID 58464312 in the BOM listing 600 of FIG. 6A may be replaced with the exhaust nozzle component with token ID 99225533 in the BOM listing 605 of FIG. 6B. In addition, the install date attribute for the replaced component may be set to the timestamp of the block that included the BOM transaction, which in this case is the timestamp associated with Block 3 215 in FIG. 2.

At operation 540, if there are additional blocks, the operations at block 535 may repeat. Otherwise, at block 550, the final BOM listing may be communicated to the requesting party. For example, the component tracking system 125 may communicate the final BOM listing to the industry agency 120.

Thus, the operations above facilitate an efficient mechanism for securely communicating the BOM listing between the entities of the environment 100 without requiring a centralized data store for maintaining the information. In addition, updates to the BOM listing are available to all the entities in real-time because updates to the BOM by, for example, an equipment maintainer 110 are immediately available to other entities when requesting a BOM listing.

FIG. 7 illustrates exemplary smart contract operations generating maintenance alerts. The operations in FIG. 7 be performed by any of the component tracking systems 125 of the environment. At block 700, a component tracking system 125 may determine the current state of the constituent components of the equipment. For example, the component tracking systems 125 may generate the current BOM for the equipment. In this regard, generation of the BOM may proceed according to the operations of FIG. 5, a subset of the operations of FIG. 5, or a different operations.

At operation 705, a first component in the BOM listing is selected and at block 710, the current usage of the component is determined. For example, the component tracking systems 125 may determine the time at which the particular component entered service via the install date attribute, a traveled distance associated with the component via the service distance attribute, a service time associated with the component via the service time attribute, and/or determine usage via other metrics.

At operation 715, the component usage (e.g., distance, time, etc.) is compared to a corresponding component usage limit (e.g., maximum distance, maximum time, etc.) of the component. If the component usage is beyond the component usage limit, then information that defines the component such as the token ID, component name, serial number, etc., may be added to a maintenance report at block 720.

At operation 725, if there are additional components, the next component is selected at block 730 and the operations may repeat from block 710.

If at operation 725, there are no further components to evaluate, then at block 735, the maintenance report may be communicated to the requesting entity.

Thus, the operations above facilitate an efficient mechanism for determining whether maintenance is required without requiring a centralized data store for maintaining the information. Moreover, any of the computer systems with access to the equipment information in the component tracking system 125 by way, for example, of a shared encryption key, may determine this information. This provides several advantages. For example, an equipment manufacturer 105 may determine that replacement of a particular component is required and send a replacement component to an equipment maintainer 115 before the equipment maintainer 115 realizes that the maintenance is required. This greatly improves the cycle time involved in maintaining the equipment and decreases the service downtime of the equipment.

FIG. 8 illustrates a computer system 800 that may form part of or implement the systems described above. The computer system 800 may include a set of instructions 845 that the processor 805 may execute to cause the computer system 800 to perform any of the operations described above. The computer system 800 may operate as a stand-alone device or may be connected, e.g., using a network, to other computer systems or peripheral devices.

In a networked deployment, the computer system 800 may operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile device, capable of executing the instructions 845 (sequential or otherwise) that specify actions to be taken by that machine. Further, each of the systems described may include any collection of sub-systems that individually or jointly execute a set, or multiple sets, of instructions to perform one or more computer functions.

The computer system 800 may include one or more memory devices 810 on a bus 820 for communicating information. In addition, code operable to cause the computer system to perform any of the operations described above may be stored in the memory 810. The memory 810 may be a random-access memory, read-only memory, programmable memory, hard disk drive or any other type of memory or storage device.

The computer system 800 may include a display 830, such as a liquid crystal display (LCD), a cathode ray tube (CRT), or any other display suitable for conveying information. The display 830 may act as an interface for the user to see the functioning of the processor 805, or specifically as an interface with the software stored in the memory 810 or in the drive unit 815.

Additionally, the computer system 800 may include an input device 825, such as a keyboard or mouse, configured to allow a user to interact with any of the components of system 800.

The computer system 800 may also include a disk or optical drive unit 815. The disk drive unit 815 may include a computer-readable medium 840 in which the instructions 845 may be stored. The instructions 845 may reside completely, or at least partially, within the memory 810 and/or within the processor 805 during execution by the computer system 800. The memory 810 and the processor 805 also may include computer-readable media as discussed above.

The computer system 800 may include a communication interface 835 to support communications via a network 850. The network 850 may include wired networks, wireless networks, or combinations thereof. The communication interface 835 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope of the claims. For example, in another exemplary implementation, one or more components of the equipment may correspond to sub-assemblies where each sub-assembly may include components and/or sub-assemblies. In this way, a BOM for a given equipment may correspond to a hierarchical/nested list of components.

In another implementation, may support the recording and tracking of a serial number hierarchy that represents a (BOM) of an asset using standard methods. As noted above, a BOM refers to the constituent components of a given piece of equipment. At its lowest level, the BOM is comprised of individual parts. These parts may be grouped into "sub-assemblies" of parts. Several sub-assemblies may be grouped into an "assembly." The equipment itself is a grouping of assemblies. The equipment can thus be conceived as the top level of the hierarchy, followed by the assembly level, sub-assembly level, and part level.

For purposes of traceability, each constituent unit within the BOM hierarchy (the equipment, each assembly, each subassembly, and key parts) may be assigned a serial number, which corresponds to a unique numeric or alphanumeric combination that is directly associated with a unit within the BOM hierarchy. The collection of serial numbers associated with the BOM hierarchy structure is the serial number hierarchy. The implementations may be adapted to support different serial number hierarchy formats and standards, such as those conforming to serial number standards for Item Unique Identification (IUID) as well as those conforming to standards such as GS1 Electronic Product Code (EPC). The serial number may conform to a different standard.

Many other modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for maintaining a piece of equipment, the method comprising:
providing a distributed block-chain database, the distributed block-chain database corresponding to a plurality of databases distributed between at least an equipment manufacturer, an equipment operator, and an equipment maintainer, wherein blocks of data in each database of the distributed block-chain database are replicated in other databases of the distributed block-chain database;
generating, in response to a request from an equipment manufacturer, a first block in a database of the distributed block-chain database associated with the equipment manufacturer that corresponds to a first bill-of-material and specifies component identification information associated with an actual original component of the equipment, wherein a component tracking data store stores original constituent component identification information that specifies original constituent components of the equipment;
subsequently copying the first block to other databases of the distributed block-chain database;
updating, by the equipment operator, the component tracking data store associated with the equipment operator that is associated with the original component to update usage information associated with the original component;
smart contract logic for determining whether the original component has reached an end of its useful service life based on the usage information of the component;
determining that the end of its useful service life is reached, causing, by the smart contract logic, a replacement component to be sent to an equipment maintainer;
replacing, by the equipment maintainer, the original component with the replacement component;
generating, in the database of the distributed block-chain database associated with the equipment maintainer, a second block corresponding to a second bill-of-material that specifies component identification information associated with the replacement component;
subsequently copying the second block to other databases of the distributed block-chain database;
receiving a request for a current listing of components in the equipment;
locating blocks in the distributed block-chain database of the component tracking system associated with the equipment;
determining from the located blocks sorted by timestamps a current listing of components to be the original constituent components of the first block;
determining whether any original constituent components have been replaced based on the timestamp of the second block in the located blocks;
generating a third bill-of-material as modified by any replacement component specified in the second block;
updating the third bill-of-material based on any additional replacement components specified in additional blocks of the located blocks according to the time stamps of the additional blocks;
generating a third block in the distributed block-chain database corresponding to the updated third bill-of-material;
subsequently copying the third block to other databases of the distributed block-chain database; and
communicating the updated third bill-of-material that includes the current listing of components and replacement components to a requesting entity.

2. The method according to claim 1, wherein blocks of the distributed block-chain database store records associated with a plurality of equipment, wherein the equipment includes parts of an aircraft.

3. The method according to claim 1, further comprising encrypting the constituent component identification information and the replacement component identification information prior to storing the constituent component identification information and the replacement component identification information into the first and second blocks.

4. The method according to claim 1, wherein the original constituent component identification information defines a unique token identifier for each constituent component of the equipment and the replacement component identification information defines a unique token identifier for the replacement component.

5. The method according to claim 1, further comprising:
receiving the original constituent component identification information and/or the replacement component identification information, and
storing the information in the distributed block-chain database.

6. The method according to claim 1, wherein the components of the equipment comprise a nested series of a plurality of components of a complex equipment.

7. The method according to claim 1, wherein each component is associated with a unique serial number that uniquely identifies a component among all components within the component tracking data store, wherein the bill-of-material defines a serial-number hierarchy of components.

8. A system for maintaining a piece of equipment, the system comprising:
an equipment manufacturer sub-system associated with an equipment manufacturer;
an equipment maintainer sub-system associated with an equipment maintainer, the equipment maintainer sub-system in communication with the equipment manufacturer sub-system; and
an equipment operator sub-system associated with an equipment operator, the equipment operator sub-system in communication with the equipment maintainer sub-system and the equipment manufacturer sub-system;
wherein each sub-system includes a database that is part of a distributed block-chain database, wherein blocks of data in each database of the distributed block-chain database are replicated in other databases of the distributed block-chain database;
wherein the equipment manufacturer sub-system is configured to:
generate, a first block in the database of the distributed block-chain database associated with the equipment manufacturer corresponding to a first bill-of-material and that specifies component identification information associated with an actual original component of the equipment, wherein a component tracking data store stores original constituent component identification information that specifies original constituent components of the equipment; and
subsequently copy the first block to other databases of the distributed block-chain database;
wherein the equipment operator sub-system is configured to:
update the component tracking data store associated with the equipment operator that is associated with the original component to update usage information associated with the original component;
wherein the equipment manufacturer sub-system is further configured to:
execute smart contract logic for determining whether the original component has reached an end of its useful service life; and if the end of its useful service life is reached, the smart contract logic causes a replacement component to be sent to the equipment maintainer, wherein the equipment maintainer sub-sequently replaces the original component with the replacement component;
wherein the equipment maintainer sub-system is configured to:
generate, in the database of the distributed block-chain database associated with the equipment maintainer, a second block corresponding to a second bill-of-material that specifies component identification information associated with the replacement component; and
subsequently copy the second block to other databases of the distributed block-chain database;
wherein the equipment manufacturer sub-system is further configured to:
receive a request for a current listing of components in the equipment;
locate blocks in the distributed block-chain database of the component tracking system associated with the equipment;
determine from the located blocks sorted by timestamps a current listing of components to be the original constituent components of the first block;
determine whether any original constituent components have been replaced based on the timestamp of the second block in the located blocks;
generate a third bill-of-material as modified by any replacement component specified in the second block;
update the third bill-of-material based on any additional replacement components specified in additional blocks of the located blocks according to the time stamps of the additional blocks;
generate a third block in the distributed block-chain database corresponding to the updated third bill-of-material;
subsequently copy the third block to other databases of the distributed block-chain database; and
communicate the updated third bill-of-material that includes the current listing of components and replacement components to a requesting entity.

9. The system according to claim 8, wherein blocks of the distributed block-chain database store records associated with a plurality of equipment.

10. The system according to claim 8, wherein each block in the distributed block-chain database includes a timestamp, wherein the instruction code is further operable to cause the processor to:
calculate an elapsed amount of time between a current time and a timestamp of a block; and
when the elapsed amount of time exceeds a useful service life associated with a component stored in a record that is stored in the block, communicate a notification to an entity associated with the equipment that is associated with the component that the component requires replacement.

11. A non-transitory computer readable medium having instruction code stored therein for maintaining a piece of equipment, the instruction code having first, second, and third code section being respectively executable by first, second, and third machines,
wherein each machine includes a database that is part of a distributed block-chain database, wherein blocks of data in each database of the distributed block-chain database are replicated in other databases of the distributed block-chain database;
wherein the first code section is executable by the first machine for causing the first machine to perform acts comprising:
generating a first block in a database of the distributed block-chain database associated with an equipment manufacturer corresponding to a first bill-of-material and that specifies component identification information associated with an actual original component of the equipment, wherein a component tracking data store stores original constituent component identification information that specifies original constituent components of the equipment; and
subsequently copying the first block to other databases of the distributed block-chain database;
wherein the second code section is executable by the second machine for causing the second machine to perform acts comprising:
updating the database of the component tracking data store associated with the second machine that is associated with the original component to update usage information associated with the original component; and subsequently updating the other databases of the distributed block-chain database to reflect the updated usage information;

wherein the first code section is further executable by the first machine for causing the first machine to perform acts comprising:

executing smart contract logic for determining whether the original component has reached an end of its useful service life; and if the end of its useful service life is reached, the smart contract logic causes a replacement component to be sent to an equipment maintainer, wherein the equipment maintainer subsequently replaces the original component with the replacement component;

wherein the third code section is executable by the third machine for causing the third machine to perform acts comprising:

generating, in the database of the distributed block-chain database associated with the third machine, a second block corresponding to a second bill-of-material that specifies component identification information associated with the replacement component; and subsequently copying the second block to other databases of the distributed block-chain database;

wherein the first code section is further executable by the first machine for causing the first machine to perform acts comprising:

receiving a request for a current listing of components in the equipment;

locating blocks in the distributed block-chain database of the component tracking system associated with the equipment;

determining from the located blocks sorted by timestamps a current listing of components to be the original constituent components of the first block;

determining whether any original constituent components have been replaced based on the timestamp of the second block in the located blocks;

generating a third bill-of-material as modified by any replacement component specified in the second block;

updating the third bill-of-material based on any additional replacement components specified in additional blocks of the located blocks according to the time stamps of the additional blocks;

generating a third block in the distributed block-chain database corresponding to the updated third bill-of-material;

subsequently copying the third block to other databases of the distributed block-chain database; and communicating the updated third bill-of-material that includes the current listing of components and replacement components to a requesting entity.

12. The non-transitory computer readable medium according to claim 11, wherein the component tracking system is one of a plurality of computer tracking systems that are in network communication with one another, wherein each component tracking system hosts a component tracking data store and wherein the component tracking data stores define a distributed block-chain database.

* * * * *